US010798864B2

(12) United States Patent
Salowitz et al.

(10) Patent No.: US 10,798,864 B2
(45) Date of Patent: Oct. 13, 2020

(54) ROW UNIT FOR WORK VEHICLE HAVING GAUGE WHEEL WITH ADJUSTABLE LATERAL POSITION

(71) Applicant: Deere & Company, Moline, IL (US)

(72) Inventors: Jacob D. Salowitz, Davenport, IA (US); Tiago Mezzomo, Horizontina (BR)

(73) Assignee: DEERE & COMPANY, Moline, IL (US)

( * ) Notice: Subject to any disclaimer, the term of this patent is extended or adjusted under 35 U.S.C. 154(b) by 289 days.

(21) Appl. No.: 15/952,075

(22) Filed: Apr. 12, 2018

(65) Prior Publication Data
US 2019/0313566 A1 Oct. 17, 2019

(51) Int. Cl.
*A01B 63/00* (2006.01)

(52) U.S. Cl.
CPC .................. *A01B 63/006* (2013.01)

(58) Field of Classification Search
CPC ... A01B 63/004; A01B 63/023; A01B 63/026; A01B 63/006; A01B 63/20; A01B 63/163; A01C 7/203
See application file for complete search history.

(56) References Cited

U.S. PATENT DOCUMENTS

| 819,533 | A | * | 5/1906 | Fowler | A01B 3/14 |
| | | | | | 172/416 |
| 935,297 | A | * | 9/1909 | Clevenger | A01B 23/06 |
| | | | | | 172/558 |
| 1,074,763 | A | * | 10/1913 | Wills | A01B 13/02 |
| | | | | | 172/507 |
| 2,051,821 | A | * | 8/1936 | Christiansen | B61J 3/00 |
| | | | | | 105/26.1 |
| 3,305,024 | A | * | 2/1967 | Ogle, Jr. | A01B 3/30 |
| | | | | | 172/212 |
| 3,625,293 | A | * | 12/1971 | Nelson | A01B 3/464 |
| | | | | | 172/212 |
| 3,820,615 | A | * | 6/1974 | Bobard | B60B 35/003 |
| | | | | | 180/340 |
| 5,074,227 | A | * | 12/1991 | Schwitters | A01C 5/06 |
| | | | | | 111/137 |
| 5,269,380 | A | * | 12/1993 | Lofquist | A01C 5/064 |
| | | | | | 111/135 |
| 5,427,038 | A | * | 6/1995 | Ege | A01C 5/064 |
| | | | | | 111/137 |
| 8,616,298 | B2 | | 12/2013 | Rylander | |
| 2011/0162565 | A1 | * | 7/2011 | Rylander | A01B 71/04 |
| | | | | | 111/200 |
| 2017/0202130 | A1 | * | 7/2017 | Schoolman | A01C 5/064 |

\* cited by examiner

*Primary Examiner* — Jessica H Lutz
(74) *Attorney, Agent, or Firm* — Klintworth & Rozenblat IP LLP

(57) ABSTRACT

A row unit for a work vehicle includes a row unit frame, a gauge wheel, and a gauge wheel coupling assembly that attaches the gauge wheel to the row unit frame at a lateral position with respect to the row unit frame. The gauge wheel coupling assembly supports the gauge wheel for lateral movement to change the lateral position of the gauge wheel. The gauge wheel coupling assembly includes a coarse adjust coupling and a fine adjust coupling. The coarse adjust coupling is configured for selectively adjusting, at a first increment, the lateral position of the gauge wheel. The fine adjust coupling is configured for selectively adjusting, at a second increment, the lateral position of the gauge wheel. The first increment is larger than the second increment.

19 Claims, 9 Drawing Sheets

ROW UNIT FOR WORK VEHICLE HAVING GAUGE WHEEL WITH ADJUSTABLE LATERAL POSITION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, such as planters and seeders, and, more particularly, relates to a row unit for a work vehicle having a gauge wheel with an adjustable lateral position.

BACKGROUND OF THE DISCLOSURE

Work vehicles, such as air seeders, planters, and other seeding devices, are configured for applying seed, fertilizer, and/or other particulate commodities to a field. The work vehicle may also include ground engaging implements, such as opener discs, closer discs, and/or other implements for providing the commodity to the soil. Furthermore, gauge wheels may be included for maintaining the opener discs, closer discs, etc., at a predetermined height relative to the surface of the ground.

In some situations, it may be useful to adjust the lateral position of the gauge wheel. For example, it may be useful to adjust the lateral position of the gauge wheel relative to an opener disc depending on soil conditions, etc. However, adjustment of the gauge wheel may be burdensome. Also, the range of travel of the gauge wheel may be limited and may be insufficient for some conditions.

SUMMARY OF THE DISCLOSURE

This disclosure provides an improved gauge wheel assembly for a row unit of a row unit, wherein the lateral position of the gauge wheel may be changed in a convenient manner and across a wide range of lateral positions.

In one aspect, the disclosure provides a row unit for a work vehicle. The row unit includes a row unit frame, a gauge wheel, and a gauge wheel coupling assembly that attaches the gauge wheel to the row unit frame at a lateral position with respect to the row unit frame. The gauge wheel coupling assembly supports the gauge wheel for lateral movement to change the lateral position of the gauge wheel. The gauge wheel coupling assembly includes a coarse adjust coupling and a fine adjust coupling. The coarse adjust coupling is configured for selectively adjusting, at a first increment, the lateral position of the gauge wheel. The fine adjust coupling is configured for selectively adjusting, at a second increment, the lateral position of the gauge wheel. The first increment is larger than the second increment.

In another aspect, the disclosure provides a row unit for a work vehicle. The row unit includes a row unit frame and a gauge wheel. The row unit also includes a gauge wheel coupling assembly that attaches the gauge wheel to the row unit frame at a lateral position with respect to the row unit frame. The gauge wheel coupling assembly supports the gauge wheel for lateral movement to change the lateral position of the gauge wheel. The gauge wheel coupling assembly includes a first member that is fixed to the row unit frame. The gauge wheel coupling assembly includes a support arm that is attached to the wheel. The gauge wheel coupling assembly includes a hub assembly. The gauge wheel coupling assembly includes a coarse adjust coupling between the hub assembly and the first member. The gauge wheel coupling assembly includes a fine adjust coupling between the support arm and the hub assembly. The coarse adjust coupling is configured for selectively adjusting, at a first increment, the lateral position of the gauge wheel along an axis. The fine adjust coupling is configured for selectively adjusting, at a second increment, the lateral position of the gauge wheel along the axis. The first increment is larger than the second increment.

Furthermore, a work vehicle is disclosed with at least one row unit that includes a row unit frame and a gauge wheel. The row unit also includes a gauge wheel coupling assembly that attaches the gauge wheel to the row unit frame at a lateral position with respect to the row unit frame. The gauge wheel coupling assembly supports the gauge wheel for lateral movement to change the lateral position of the gauge wheel. The gauge wheel coupling assembly includes a shank that is fixed to and that extends laterally from the row unit frame. The shank includes a plurality of first alignment apertures that are spaced apart along an axis of the shank. The gauge wheel coupling assembly has a support arm attached to the wheel. The gauge wheel coupling assembly includes a hub assembly with a second alignment aperture. The gauge wheel coupling assembly includes a coarse adjust coupling with an alignment pin that is received in the second alignment aperture and one of the first alignment apertures to retain the hub assembly in a fixed position along the axis. The gauge wheel coupling assembly includes a threaded fine adjust coupling between the hub assembly and the support arm. The coarse adjust coupling is configured for selectively adjusting, at a first increment, the lateral position of the gauge wheel. The fine adjust coupling configured for selectively adjusting, at a second increment, the lateral position of the gauge wheel. The first increment is larger than the second increment.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
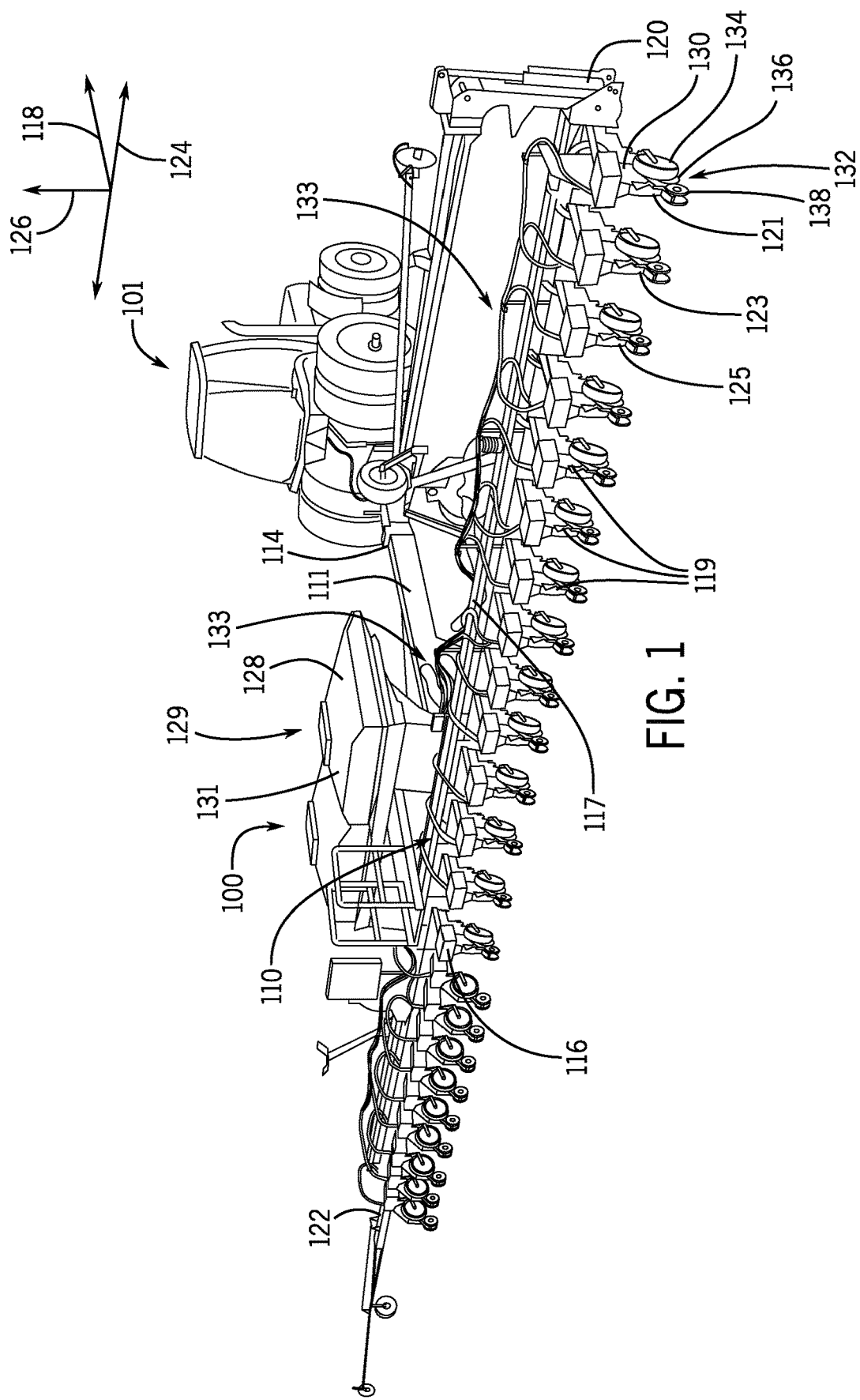
FIG. 1 is an isometric view of a work vehicle with a plurality of row units according to example embodiments of the present disclosure.

The following describes one or more example embodiments of a gauge wheel assembly for a row unit of a work vehicle, wherein the lateral position of a gauge wheel is adjustable in a convenient manner and along a wide range of travel. Methods of manufacturing and/or operating the gauge wheel assembly are also disclosed. The embodiments are illustrated as shown in the accompanying drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction.

The following describes one or more example implementations of the disclosed work vehicle, as shown in the accompanying figures of the drawings described briefly above. Generally, the disclosed work vehicle includes a plurality of row units with gauge wheels supported on a row unit frame. At least one gauge wheel is attached to the row unit frame via an adjustable gauge wheel coupling assembly. The coupling assembly may be adjusted for selectively changing a lateral position of the gauge wheel relative to the row unit frame, relative to an opener disc, or relative to another structure.

The gauge wheel coupling assembly may include a coarse adjust coupling and a fine adjust coupling, both for selectively adjusting the lateral position of the gauge wheel. The coarse adjust coupling may adjust the lateral position at a larger interval as compared to the fine adjust coupling.

Accordingly, a user may move the gauge wheel laterally to be closer to an opener disc and closer to a furrow formed by the opener disc. The user may adjust the fine adjust coupling to slightly (finely) change the lateral position relative to the opener disc to ensure proper soil compaction proximate the furrow and for providing a suitable seed bed, even at high planting speeds. Alternatively, the user may adjust the coarse adjust coupling to quickly and conveniently move the gauge wheel a significant distance with relatively little effort. For example, in some conditions, soil and mud may build up on the gauge wheel if too close to the opener disc and impede rotation of the gauge wheel. Thus, using the coarse adjust coupling, the user may quickly and conveniently move the gauge wheel outward and away from the opener disc.

FIG. 1 illustrates a work vehicle 100 according to example embodiments of the present disclosure. The work vehicle 100 may be towed by another vehicle, such as a tractor 101. Thus, the work vehicle 100 may be a towed work vehicle. In other embodiments, the work vehicle 100 of the present disclosure may be a self-propelled vehicle. In some embodiments, the work vehicle 100 may be a planter or seeder configured for agricultural work. It will be appreciated that the illustrated work vehicle 100 is an example embodiment. One or more features of the present disclosure may be included on a different work vehicle without departing from the scope of the present disclosure.

The work vehicle 100 includes a front end 114 and a rear end 116. The work vehicle 100 also includes a first side 120 and a second side 122. A fore-aft axis 118, extending between the rear end 116 and the front end 114, is indicated in FIG. 1 for reference purposes. It will be appreciated that a travelling direction of the work vehicle 100 extends along the axis 118 from the rear end 116 toward the front end 114. A lateral axis 124 is also indicated in FIG. 1, and it will be appreciated that a lateral direction of the work vehicle 100 (extending between the first side 120 and the second side 122) is parallel to the lateral axis 124. Furthermore, a vertical axis 126 is indicated in FIG. 1 for reference purposes.

Generally, the work vehicle 100 may include a frame structure 110 (i.e., a chassis). The frame structure 110 may include an elongate tongue 111. The tongue 111 may be a rigid or telescoping beam that extends along the fore-aft axis 118. The tongue 111 may include a towing package for hitching and unhitching from the tractor 101. The frame structure 110 may further include a lateral beam 117. The lateral beam 117 may be a rigid member that extends along the lateral axis 124. The lateral beam 117 may be fixed to the tongue 111 of the frame structure, proximate the rear end 116 of the work vehicle 100.

The work vehicle 100 may also include a commodity system 129 with at least one tank 131 and a commodity distribution system 133. The tank 131 may contain a bulk amount of a commodity (e.g., seed, fertilizer, etc.), and the distribution system 133 may include hoses, lines, etc. that are configured to distribute the commodity from the tank 131 to a plurality of row units 119. The commodity system 129 may also include a metering system that meters out a predetermined amount of the commodity delivered to the row units 119.

The row units 119 may be attached to the lateral beam 117 of the frame structure 110. The row units 119 may branch rearwardly from the lateral beam 117 to define much of the rear end 116 of the work vehicle 100. The plurality of row units 119 may be substantially similar to each other and may include a first row unit 121, a second row unit 123, a third row unit 125, and so on, across the rear end 116 and along the lateral axis 124.

The first row unit 121, as a representative example of the other row units 119, may include a row unit frame 130. The row unit frame 130 may include a plurality of strong and rigid brackets, linkages, etc., that support other components that will be discussed. The row unit frame 130 may be attached to the frame structure 110. For example, the row unit frame 130 may be moveably attached to the lateral beam 117 via a linkage that allows movement of the row unit frame 130 along the vertical axis 126 relative to the frame structure 110.

The first row unit 121 may also include a ground system 132. The ground system 112 may include one or more gauge wheels 134 that are attached to the row unit frame 130. The ground system 132 may also include one or more ground engaging implements that move soil (e.g., to create and close a furrow as the vehicle 100 moves across the field). Specifically, in some embodiments, the ground system 132 may include one or more opener discs 136 (i.e., opener implements) and one or more closer discs 138 (i.e., closer implements). Generally, as the vehicle 100 travels, the opener discs 136 may open a furrow in the soil, seed may be deposited in the open furrow, and the closer discs 138 may close the furrow over the seed. Additionally, the gauge wheels 134 may ride on the surface of the ground as the vehicle 100 travels, maintaining a set vertical position of the row unit 121 above the ground. Thus, the gauge wheels 134 may maintain a set depth of the furrow created by the opener discs 136.

Figure 2:
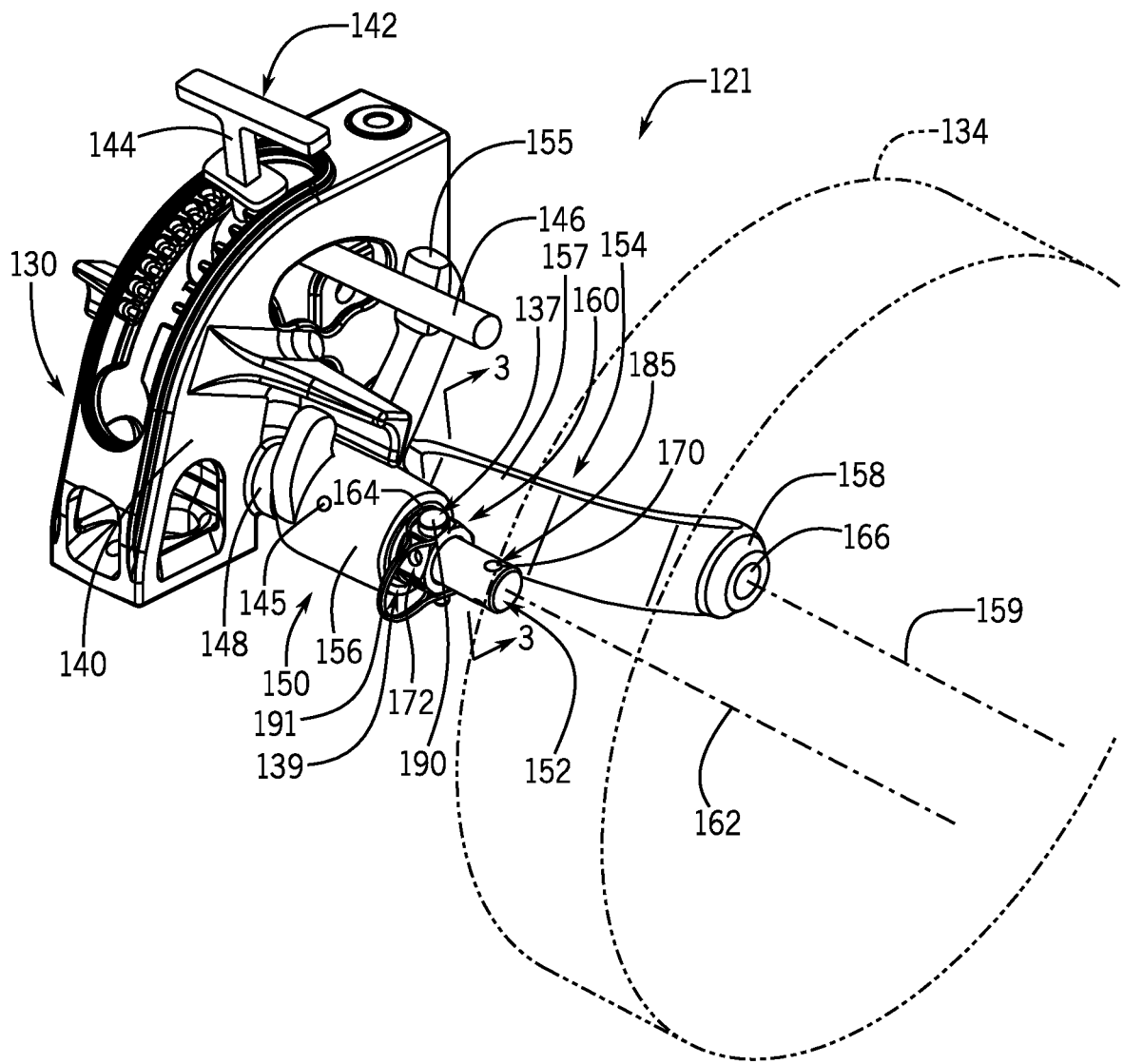
FIG. 2 is an isometric view of a portion of a row unit of the work vehicle of FIG. according to example embodiments.

Referring now to FIG. 2, portions of the first row unit 121 are shown in more detail. As shown, the row unit frame 130 may include a central member 140. A depth adjustment member 142 may be included and attached to the central member 140. The depth adjustment member 142 may include a handle 144 that extends upwardly and rearwardly from the central member 140 and an abutment member 146 that extends laterally outward from the central member 140. The central member 140 may also include a hub 148 that faces substantially laterally outward.

The row unit 121 may also include a gauge wheel coupling assembly 150 that attaches at least one of the gauge wheels 134 to the hub 148 of the central member 140. (The gauge wheel 134 is shown in phantom for purposes of clarity.) Generally, the gauge wheel coupling assembly 150 may include a shank 152 (i.e., a first member) that extends from the central member 140 of the frame. The gauge wheel coupling assembly 150 may also include a support arm 154 with a frame attachment end 156 and a wheel attachment end 158. The wheel attachment end 158 is attached to the gauge wheel 134 and supports the gauge wheel 134 for rotation about a first axis 159. The gauge wheel coupling assembly 150 may further include a hub assembly 160 (i.e., a second member) that attaches the frame attachment end 156 of the support arm 154 to the shank 152. As such, the support arm 154 (and the attached gauge wheel 134 may be supported for rotation about a second axis 162. The support arm 154 may additionally include a projection 155 that projects from the frame attachment end 156, transverse to the axis 162. The projection 155 may abut the abutment member 146 to limit rotation of the support arm 154 about the second axis 162 in one direction. It will be appreciated that the user may adjust the position of the abutment member 146 (using the handle 144) to thereby adjust and control the vertical height of the gauge wheel 134 relative to the central member 140 of the row unit frame 130.

As will be discussed in detail, the gauge wheel coupling assembly 150 may include a coarse adjust coupling 137 and a fine adjust coupling 139. The coarse adjust coupling 137 may adjustably attach at least two different members of the assembly 150 together. Adjustment of the coarse adjust coupling 137 changes the relative position of the at least two members to change a lateral position of the gauge wheel 134 relative to the central member 140 of the row unit frame 130. Likewise, the fine adjust coupling 139 may adjustably attach at least two different members of the assembly 150 together, and adjustment of the fine adjust coupling 139 changes the lateral position of the gauge wheel 134. However, adjustment of the coarse adjust coupling 137 changes the lateral position at a larger increment than adjustment of the fine adjust coupling 139. In other words, adjustment of the coarse adjust coupling 137 results in a larger amount of lateral displacement of the gauge wheel 134 and/or a higher rate of position change as compared to adjustment of the fine adjust coupling 139. Furthermore, in some embodiments, the lateral position of the gauge wheel 134 changes in larger steps using the coarse adjust coupling 137 as compared to the fine adjust coupling 139.

Figure 3:
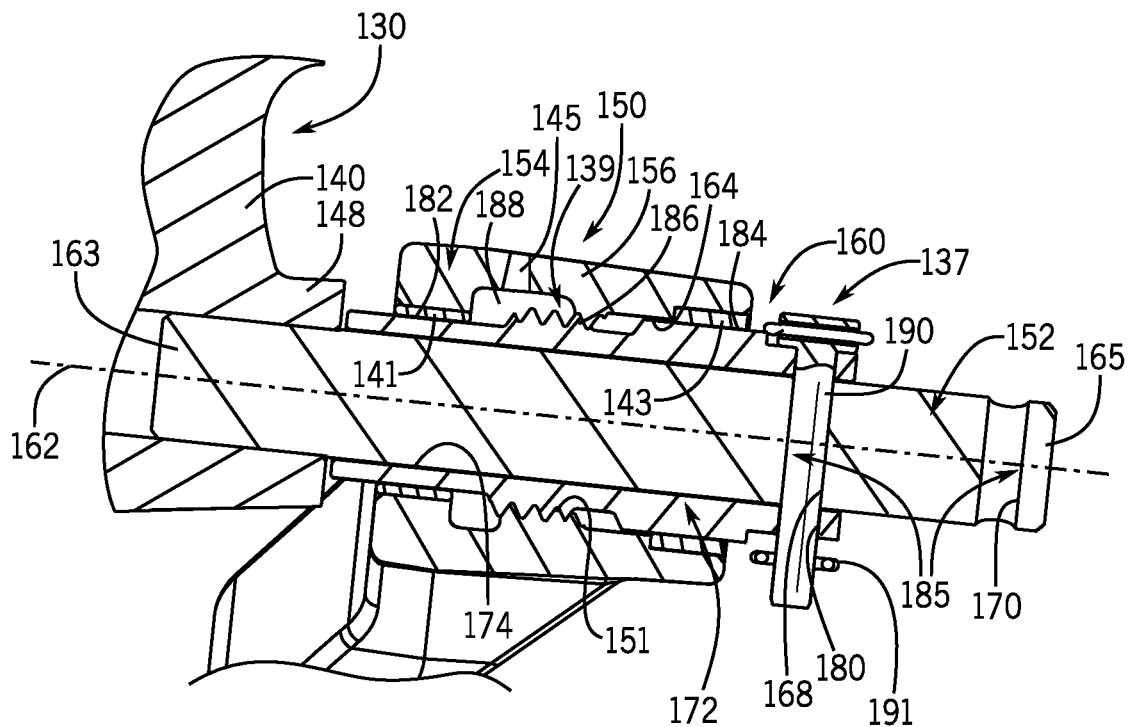
FIG. 3 is a section view of a gauge wheel coupling assembly of the row unit taken along the line 3-3 of FIG. 2, wherein the assembly is shown in a first, retracted position.
Figure 4:
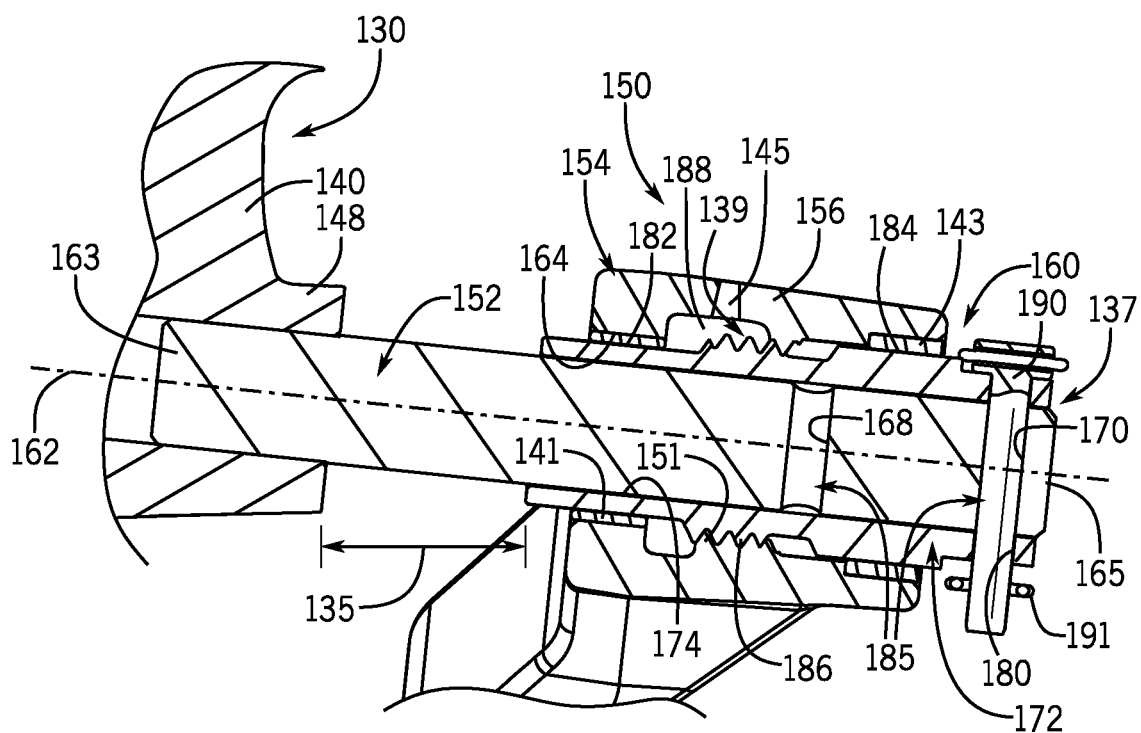
FIG. 4 is a section view of the gauge wheel coupling assembly shown in a second, extended position.

In some embodiments, such as those embodiments represented in FIGS. 2-4, the coarse adjust coupling 137 and the fine adjust coupling 139 may attach the support arm 154 to the shank 152. The lateral position of the gauge wheel 134 may be varied along the axis 162 using the coarse adjust coupling 137 and the fine adjust coupling 139. In other words, the coarse adjust coupling 137 and the fine adjust coupling 139 may both be configured for changing lateral position of the gauge wheel 134 along the same axis (common axis). It will be appreciated that the axis 162 extends substantially in the lateral direction. However, in some embodiments, the axis 162 may be disposed at a slight angle (e.g., up to ten degrees) with respect to the lateral axis 124 in the horizontal plane. In some embodiments, the axis 162 may be directed slightly downward and may be disposed at a slight angle (e.g., up to ten degrees) with respect to the vertical axis 126. However, it will be appreciated by those having ordinary skill in the art that the majority of displacement occurs along the lateral axis 124 when using the coarse adjust coupling 137 and the fine adjust coupling 139.

Referring now to FIGS. 2-4, the gauge wheel coupling assembly 150 will be discussed in greater detail. As shown, the shank 152 may be a shaft, bolt, cylinder, rod, etc. The shank 152 may have a substantially circular cross section (taken normal to the axis 162). As shown in FIGS. 3 and 4, the shank 152 may include an inner end 163 and an outer end 165 that are spaced apart along the axis 162. The inner end 163 may be received within and fixed to the hub 148 of the row unit frame 130. In some embodiments, the inner end 163 may be welded to the hub 148. In other embodiments, the inner end 163 may be threadably attached to the hub 148. The outer end 165 may be spaced outward laterally from the hub 148. Furthermore, the shank 152 may include a plurality of first alignment apertures 185, such as holes, grooves, etc. In the illustrated embodiment, for example, the first alignment apertures 185 may include an inner alignment hole 168 and an outer alignment hole 170, which are spaced apart along the axis 162.

Additionally, as shown in FIG. 2, the support arm 154 may be an elongate and rigid bar, wherein the frame attachment end 156 and the wheel attachment end 158 are attached by an intermediate portion 157. The frame attachment end 156 may include a frame side aperture 164, such as a through-hole or bore, that receives the hub assembly 160. The wheel attachment end 158 may include a wheel side aperture 166, such as a through-hole, that receives an axle of the gauge wheel 134.

As shown in FIGS. 3 and 4, the support arm 154 may further include an inner threading 151 disposed on an inner diameter of the frame side aperture 164. Additionally, a first bearing member 141 and a second bearing member 143 may be fixed to the support arm 154 within the frame side aperture 164. The first and second bearing members 141, 143 may be ring-shaped and may be spaced apart along the axis 162.

In some embodiments, the support arm 154 may include at least one lubrication hole 145 extending through the frame attachment end 156 of the support arm 154. The lubrication hole 145 may extend into the frame side aperture 164 and may provide a pathway for lubricant (oil) to be introduced therein. The lubrication hole 145 may also be selectively sealed to prevent leakage of the lubricant.

Figure 5:
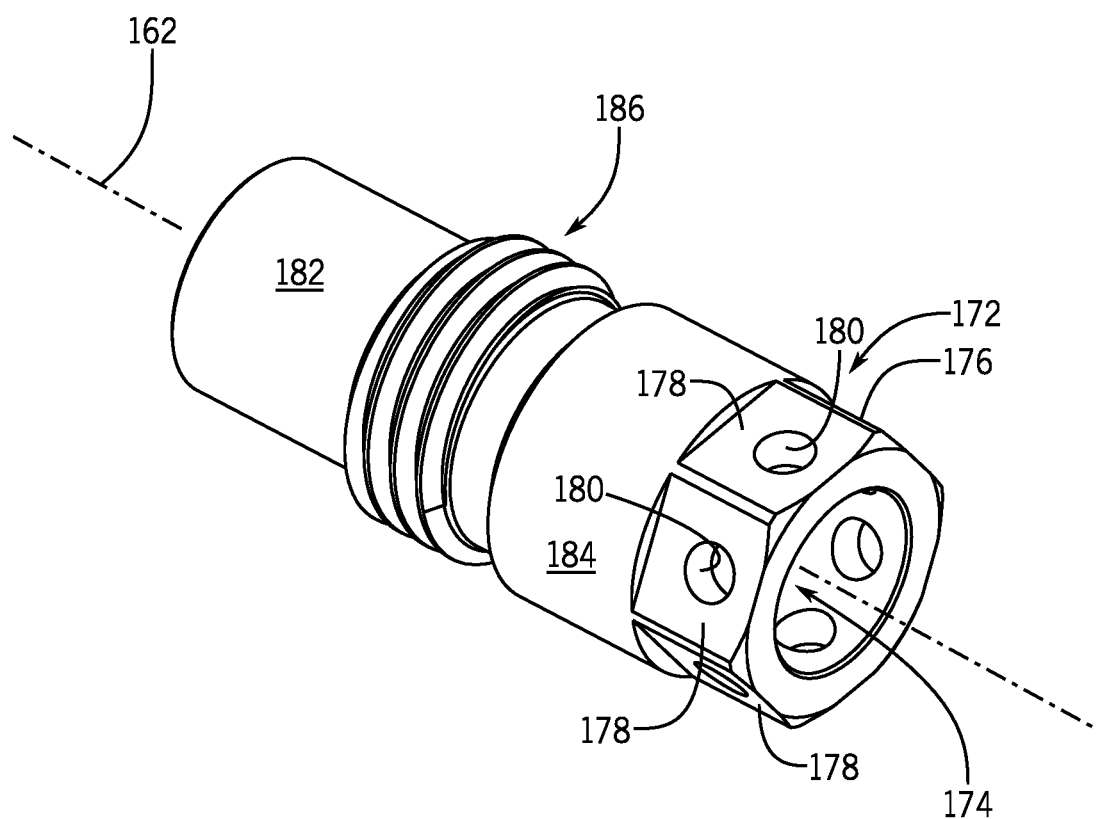
FIG. 5 is an isometric view of an adjustment bushing of the gauge wheel coupling assembly of FIG. 3.

Furthermore, as shown in FIG. 5, the hub assembly 160 may include an adjustment bushing 172. The adjustment bushing 172 may be a generally tubular and hollow member with an inner bore 174 extending along the axis 162. The adjustment bushing 172 may also include a head 176 with at least one substantially flat surface 178. In the illustrated embodiment, there are a plurality (e.g., six) flat surfaces 178 disposed in a polygonal (e.g., hexagonal) arrangement about the head 176. The adjustment bushing 172 may further include at least one second alignment aperture 180. In some embodiments, there may be second alignment apertures 180 extending normal to each of the flat surfaces 178 of the head 176. Furthermore, the adjustment bushing 172 may include a first bearing surface 182 and a second bearing surface 184. The first and second bearing surfaces 182, 184 may be substantially smooth cylindrical surfaces on the outside of the bushing 172. The first bearing surface 182 may have a smaller diameter than the second bearing surface 184. Moreover, the second bearing surface 184 may be disposed between the head 176 and the first bearing surface 182 with respect to the axis 162. Furthermore, the adjustment bushing 172 may include an outer threading 186. The outer threading 186 may be disposed between the first bearing surface 182 and the second bearing surface 184 with respect to the axis 162.

As shown in FIGS. 2 and 3, the inner bore 174 of the bushing 172 may receive the shank 152. As such, the bushing 172 may be supported for sliding movement on the shank 152 along the axis 162. In other words, the inner diameter of the inner bore 174 may correspond to the outer diameter of the shank 152 such that the bushing 172 is supported for sliding movement inward and outward laterally along the axis 162.

Furthermore, the frame side aperture 164 of the support arm 154 may receive at least part of the bushing 172. In some embodiments, the outer threading 186 of the bushing 172 may be threadingly engaged with the inner threading 151 of the support arm 154 (FIGS. 3 and 4). Also, the first bearing surface 182 may be supported for rotation on the first bearing member 141 of the support arm 154, and the second bearing surface 184 may be supported for rotation on the second bearing member 143 of the support arm 154. Furthermore, as shown in FIGS. 3 and 4, a cavity 188 may be defined in the space between the bushing 172 and the support arm 154. Lubricant (provided via the lubricant hole 145) may be provided within the cavity 188 for lubricating the threaded joint between the bushing 172 and the support arm 154.

Moreover, the assembly 150 may include a retainer member, such as a pin 190. The pin 190 may be received in at least one of the second alignment apertures 180 and received in at least one of the first alignment apertures 185. In FIGS. 2 and 3, the pin 190 is shown within a pair of the second alignment apertures 180 as well as the inner alignment hole 168 of the shank 152. The pin 190 may also include a strap 191 or another retainer to keep the pin 190 within the apertures 180. Accordingly, the pin 190 may retain the bushing 172 (and the attached support arm 154 and gauge wheel 134) in a fixed lateral position—a retracted position—relative to the row unit frame 130.

As stated above, the gauge wheel coupling assembly 150 may include the coarse adjust coupling 137, for example, for selectively changing the gauge wheel 134 from the retracted position (FIG. 3) to an extended position (FIG. 4). In the embodiment of FIG. 3, for example, the coarse adjust coupling 137 comprises the pin 190, portions of the first member with the first alignment apertures 185, and portions of the bushing 172 with the second alignment apertures 180. Thus, in some embodiments represented in FIGS. 2-4, the coarse adjust coupling 137 engages the bushing 172 to the shank 152 at a fixed position along the axis 162.

Specifically, to shift the gauge wheel 134 from the retracted position of FIG. 3 to the extended position of FIG. 4, the pin 190 may be removed from the inner alignment hole 168 of the shank 152 and the second alignment aperture 180 of the bushing 172. Once the pin 190 is removed, the bushing 172 (and the attached support arm 154 and gauge wheel 134) may slide outward along the axis 162 until the second alignment aperture(s) 180 of the bushing 172 align with the outer alignment hole 170 of the first member 154. Then, the pin 190 may be replaced in the aligned aperture 180 and outer alignment hole 170.

When necessary, the pin 190 may be removed, and the gauge wheel 134 may be shifted back to retracted position. Then, the pin 190 may be replaced within the second alignment apertures 180 of the bushing 172 align with the inner alignment hole 168 (FIG. 3).

Using the coarse adjust coupling 137, the operator may quickly and conveniently shift the gauge wheel 134 laterally across a large range of displacement (a lateral distance indicated in FIG. 4 at 135). In some embodiments, the range of lateral motion of the gauge wheel when moving between the retracted position and the extended position using the coarse adjust coupling 137 is approximately 38.75 millimeters.

In addition, the gauge wheel coupling assembly 150 may include the fine adjust coupling 139. In the embodiment of FIG. 3, for example, the fine adjust coupling 139 comprises the threaded attachment between the outer threading 186 of the bushing 172 and the inner threading 151 of the support arm 154. Thus, in some embodiments represented in FIGS. 2-4, the fine adjust coupling 139 may attach the bushing 172 to the support arm 154. The lateral position of the gauge wheel 134 may change as the outer threading 186 threadably advances along the inner threading 151.

In some embodiments, the fine adjust coupling 139 is used when the gauge wheel 134 and the assembly 150 are in the retracted position (FIG. 3). Thus, the gauge wheel 134 may be proximate the opener disc 136 (FIG. 1), and the space therebetween may be adjusted. In some embodiments, the fine adjust coupling 139 may allow the gauge wheel 134 to abut against the opener disc 136. That position may be referred to as an inboard position. The fine adjust coupling may allow the gauge wheel 134 to move to an outboard position as well. The range of motion between this inboard position and the outboard position may be relatively small (e.g., between five to ten millimeters). It will be appreciated that the range of positions available using the fine adjust coupling 139 may or may not overlap with the range of positions available using the coarse adjust coupling 137.

Using the fine adjust coupling 139, the lateral position of the gauge wheel 134 may be specifically selected, tuned, and tailored for specific operating conditions of the work vehicle 100. To finely adjust the lateral position of the gauge wheel 134, the pin 190 may be removed from the assembly 150. Then, the bushing 172 may be turned relative to the support arm 154. In some embodiments, a wrench or other turning tool may engage the head 172 for turning and threadably advancing the bushing 172 on the inner threading 151 of the support arm 154. In the illustrated embodiment, there are six apertures 180 on the head 176. Thus, the head 176 may be rotated in either direction by sixty degree intervals to align the neighboring aperture 180 with the inner alignment hole 188. This advances the bushing 172 a predetermined distance along the axis 162 relative to the support arm 154. In some embodiments, every sixty-degree turn of the bushing 172 advances the fine adjust coupling 139 by approximately 0.25 millimeters. Once the selected apertures 180 are aligned with the inner alignment hole 188, the pin 190 may be reattached.

Figure 6:
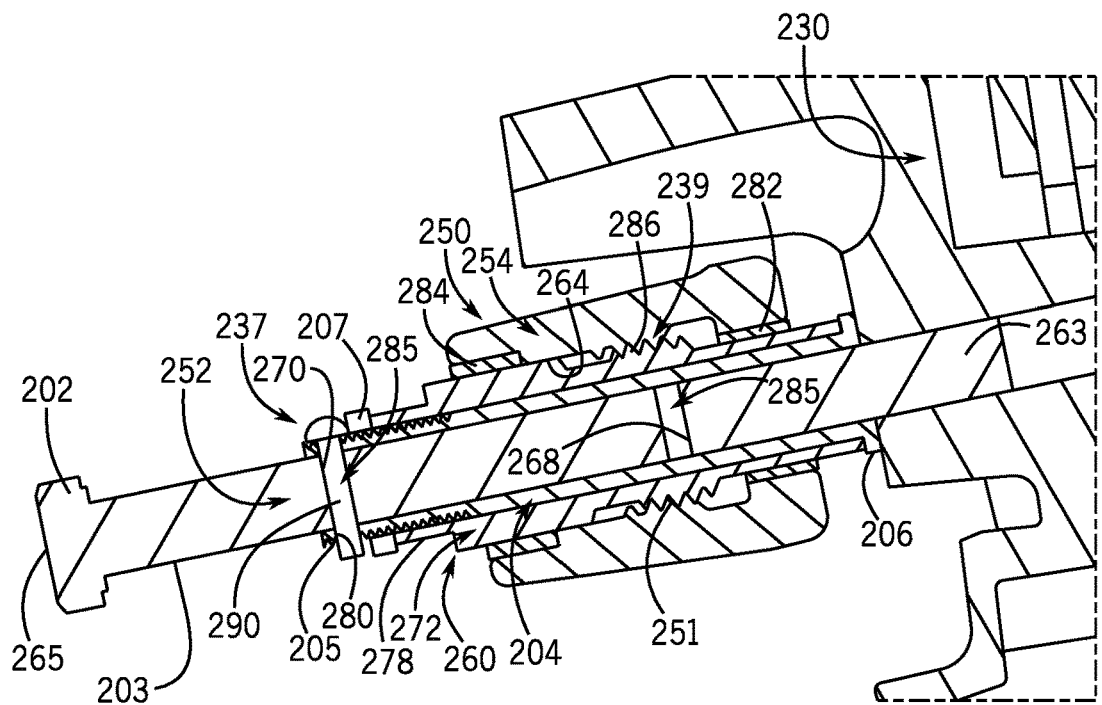
FIG. 6 is a section view of the gauge wheel coupling assembly according to additional example embodiments, wherein the assembly is shown in the retracted position.
Figure 7:
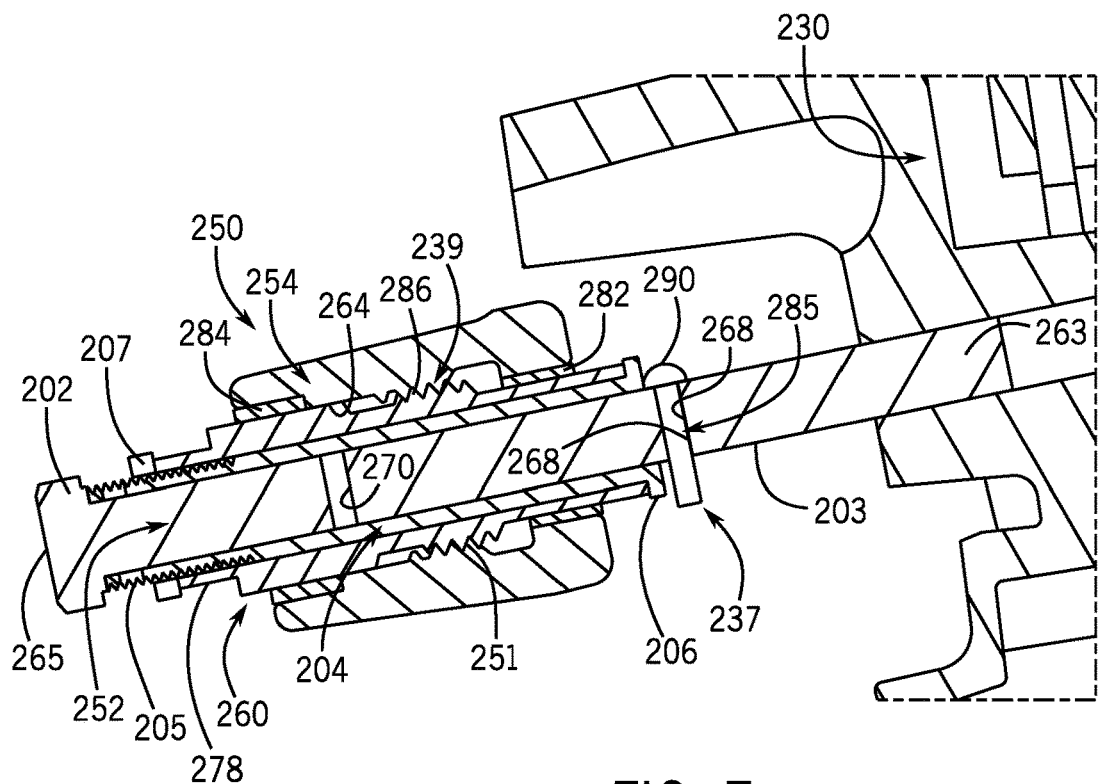
FIG. 7 is a section view of the gauge wheel coupling assembly of FIG. 6, wherein the assembly is shown in the extended position.

Referring now to FIGS. 6 and 7, the gauge wheel coupling assembly 250 will be discussed according to additional embodiments of the present disclosure. The embodiment of FIG. 5 may include features described above with respect to FIGS. 2-5. The description of those features will not be repeated for purposes of conciseness. Components that correspond to those of FIGS. 2-5 will be indicated with corresponding reference numbers increased by 100.

The gauge wheel coupling assembly 250 may include the shank 252. The shank 252 may include an inner end 263 that is removably attached to the frame 230. The inner end 263 may be threadably attached and fixed to the frame 230 in some embodiments. The shank 252 may also include an outer end 265 with an enlarged head 202. Furthermore, the shank 252 may be cylindrical and may include a smooth outer surface 203. Additionally, the shank 252 may include a plurality of first alignment apertures 285 that are spaced apart at a distance along its axis.

The assembly 250 may further include the support arm 254. The support arm 254 may include the frame side aperture 264. The first bearing 284 and the second bearing 282 may be attached to the support arm 254 within the frame side aperture 264.

The assembly 250 may additionally include the hub assembly 260. The hub assembly 260 may attach the support arm 254 to the shank 252. In some embodiments, the hub assembly 260 may include a sleeve 204. The sleeve 204 may be hollow and tubular. The sleeve 204 may include an outer threaded portion 205 on one end. The opposite end of the sleeve 204 may include a ridge 206 that extends outward radially. Furthermore, the sleeve 204 may include one or more second alignment apertures 280. In some embodiments, the second alignment apertures 280 may extend through the threaded portion 205.

The sleeve 204 may receive the shank 252 and may slide longitudinally on the outer surface 203 of the shank 252. In the retracted position of FIG. 6, the pin 290 may be received within the second alignment aperture 280 and the outer alignment hole 270 to retain the sleeve 204 in a fixed position on the shank 252. In the extended position of FIG. 7, the sleeve 204 may be disposed outward laterally on the shank 252, the pin 290 may be received within the inner alignment hole 268, and the sleeve 204 may be retained in a fixed position on the shank 252 between the head 202 and the pin 290.

Additionally, the hub assembly 260 may include the adjustment bushing 272. The bushing 272 may include the head 278 as well as the outer threading 286 described above with respect to FIG. 5.

Furthermore, the assembly 250 may include a retainer member 207, such as a retainer nut. The retainer member 207 may be hexagonal in some embodiments. The retainer member 207 may be threadably engaged to the outer threaded portion 205 of the sleeve 204. The retainer member 207 may also be threadably tightened (in a tightened position) against the head 278 of the adjustment bushing 272 so that the adjustment bushing 272 is compressed between the retainer member 207 and the ridge 206 of the sleeve 204. The retainer member 207 may be threadably loosened away from the adjustment bushing 272 (in a loosened position) to allow the adjustment bushing 272 to be threadably advanced relative to the support arm 254.

Accordingly, the assembly 250 may include a coarse adjustment coupling 237 with which the gauge wheel may move between a retracted position (FIG. 6) and an extended position (FIG. 7). To move from the retracted position to the extended position, the pin 290 may be removed, the sleeve 204 may slide outward along the shank 252, and the pin 290 may be replaced into the inner alignment hole 268. Thus, the hub assembly 260 may be retained in a fixed lateral position between the pin 290 and the head 202 of the shank 252. To move the gauge wheel back to the retracted position, the pin 290 may be removed, the sleeve 204 may slide inward along the shank 252, and the pin 290 may be replaced into the second alignment aperture 280 and the outer alignment hole 270. In both cases, when moving the assembly 250 between the extended position and the retracted position, the hub assembly 260 and the support arm 254 (as well as the attached gauge wheel) may slide on the shank 250 as a unit. Then, the pin 290 may be replaced to retain the assembly 250 in the selected position.

The assembly 250 may also include a fine adjustment coupling 239. To make fine lateral adjustments, the retainer member 207 may be threadably advanced away from the adjustment bushing 272 and loosened therefrom. Then, the adjustment bushing 272 may be turned relative to the support arm 254 to threadably advance the outer threading 286 on the inner threading 251. Once adjusted, the retainer member 207 may be re-tightened against the bushing 272.

Figure 8:
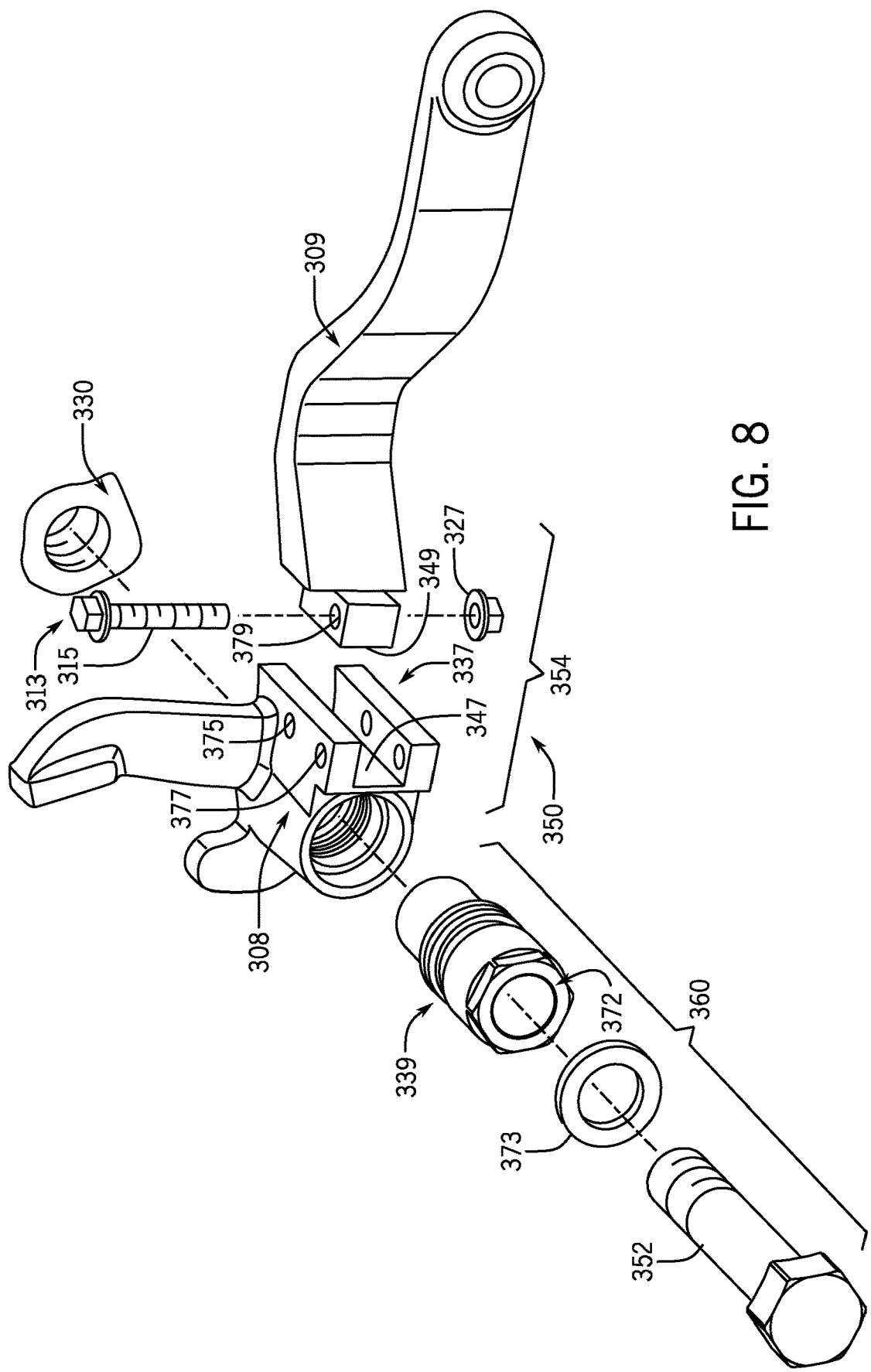
FIG. 8 is an exploded view of the gauge wheel coupling assembly according to additional example embodiments.
Figure 10:
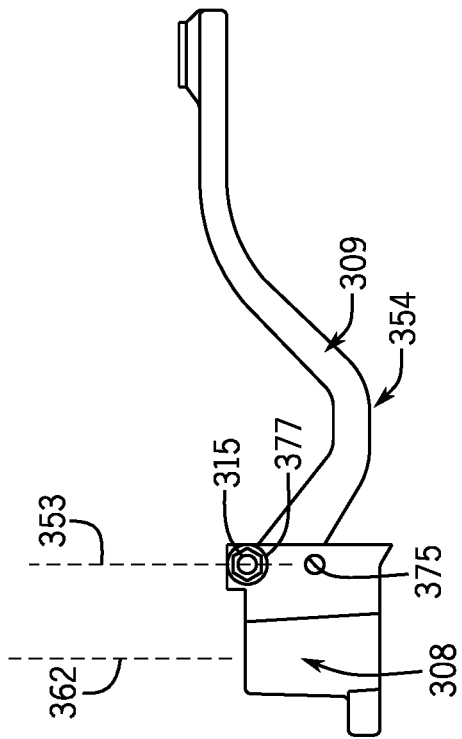
FIG. 10 is a bottom view of the gauge wheel coupling assembly of FIG. 8 shown in the extended position.
Figure 9:
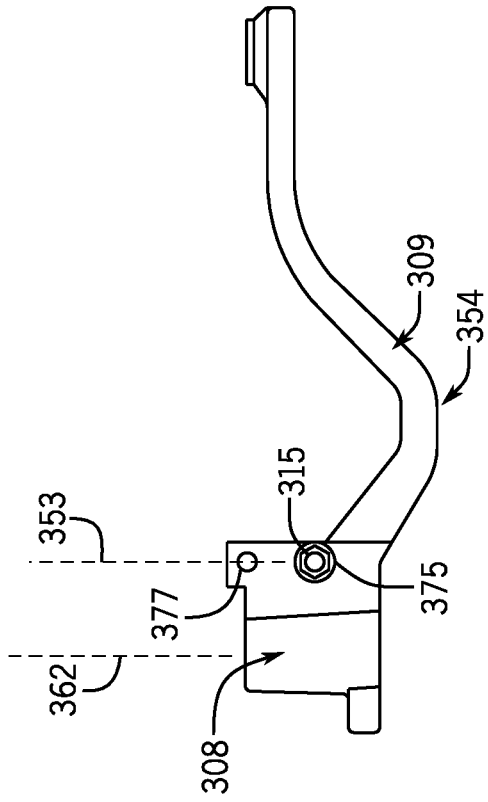
FIG. 9 is a bottom view of the gauge wheel coupling assembly of FIG. 8 shown in the retracted position.

Referring now to FIGS. 8-10, the gauge wheel coupling assembly 350 will be discussed according to additional embodiments of the present disclosure. The embodiment of FIGS. 8-10 may include features described above with respect to FIGS. 2-5. The description of those features will not be repeated for purposes of conciseness. Components that correspond to those of FIGS. 2-5 will be indicated with corresponding reference numbers increased by 200.

The assembly 350 may include the support arm 354. The support arm 354 may be substantially similar to the embodiments discussed above, except the support arm 354 may include a first member 308 and a second member 309. The first member 308 may be attached to the frame (not shown) by the hub assembly 360. The second member 309 may be attached to the gauge wheel (not shown). The first member 308 and the second member 309 may be attached via a fastener 313, such as a bolt 315 and nut 327. More specifically, the fastener 313 may be received within an alignment hole 379 of the second member 309 and within one of the alignment holes 375, 377 of the first member 308.

The assembly 350 may further include a hub assembly 360. The hub assembly 360 may include a shank 352, a washer 373, and an adjustment bushing 372. The shank 352 may be received within the washer 373 and the adjustment bushing 372 and threadably fixed to the frame 330. The adjustment bushing 372 may threadably engage an outer diameter threading that is engaged with the inner diameter threading of the support arm 354. The hub assembly 360 may include one or more features disclosed in U.S. Pat. No. 8,616,298 to Rylander, issued on Dec. 31, 2013, which is incorporated by reference in its entirety.

Thus, the assembly 350 may include a coarse adjustment coupling 337 with which the gauge wheel may move between a retracted position (FIG. 9) and an extended position (FIG. 10). The second member 309 may be adjusted relative to the first member 308 along an adjustment axis 353. The adjustment axis 353 may be a straight line that intersects the holes 375, 377. To move from the retracted position to the extended position, the pin 390 may be removed from the assembly 350 and re-inserted into the alignment hole 379 and the alignment hole 377. To move the assembly 350 back to the retracted position, the pin 390 may be removed and re-inserted into the alignment hole 379 and the alignment hole 375. In some embodiments, the first member 308 may include a planar face 347 that mates against a planar face 349 of the second member 309 to limit (prevent) rotation of the first and/or second member 308, 309 about the axis of the fastener 313.

The assembly 350 may further include a fine adjust coupling 339. To make fine adjustments of the lateral position of the gauge wheel, the shank 352 may be threadably loosened (moved to a loose position), allowing the bushing 372 to threadably advance relative to the first member 308 of the support arm 354. Once adjusted, the shank 352 may be re-tightened against the adjustment bushing 372 (moved to a tightened position) to fix the bushing 372 in lateral position relative to the support arm 354. It will be appreciated that the adjustment axis 362 for the fine adjust coupling 339 may be spaced apart at a distance from the adjustment axis 353 of the coarse adjust coupling 337.

Figure 11:
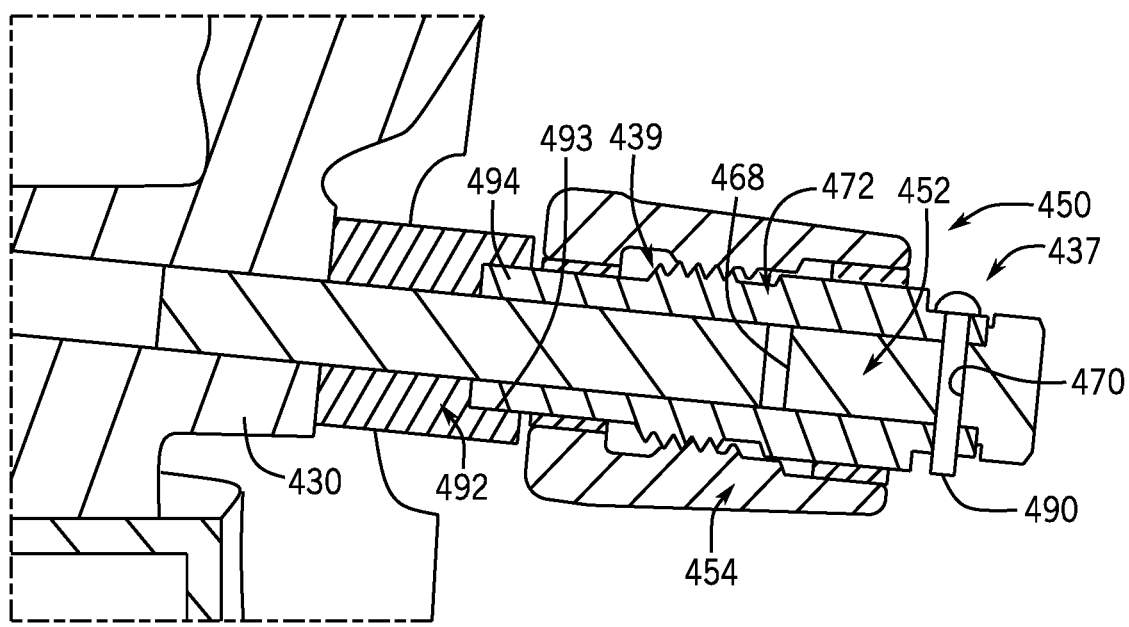
FIG. 11 is a section view of the gauge wheel coupling assembly according to additional example embodiments.

Referring now to FIG. 11, the gauge wheel coupling assembly 450 is shown according to additional embodiments. The assembly 450 may be substantially similar to one or more embodiments discussed above. Components that correspond to those of the embodiments of FIGS. 2-5 are indicated with corresponding reference numbers increased by 300.

The assembly 450 may include the shank 452, the adjustment bushing 472, and the support arm 454. The coarse adjust coupling 437 may comprise the pin 490, which is received in either the outer alignment hole 470 or the inner alignment hole 468. The pin 490 may be pulled out and the assembly 450 may be adjusted between the extended and lateral positions, similar to the above embodiments. The fine adjust coupling 439 may comprise a threaded attachment between the adjustment bushing 472 and the support arm 454. The pin 490 may be pulled, the shank 452 may be loosened from the frame 430, and the bushing 472 may be rotated relative to the support arm 454 to make fine adjustments to the lateral position. Then, the shank 452 may be re-tightened to lock the support arm 454 in the set position.

The assembly 450 may also include a spacer 492. The spacer 492 may be substantially cylindrical and may be disposed between the adjustment bushing 472 and the frame 430. In some embodiments, the spacer 492 may receive a portion of the shank 452. Also, one end of the spacer 492 may abut the frame 430, and the opposite end may include a recess 493 that receives an inner end 494 of the adjustment bushing 472. The shank 452 may be longer than those of the previous embodiments, necessitating use of the spacer 492. The spacer 492 allows the gauge wheel to be positioned further outward laterally as compared to other embodiments. The shank 452 may be replaceable with a shank that is shorter or longer. The spacer 492 may also be replaceable with spacers of other lengths. Accordingly, the assembly 450 may have a high degree of adjustability.

Figure 12:
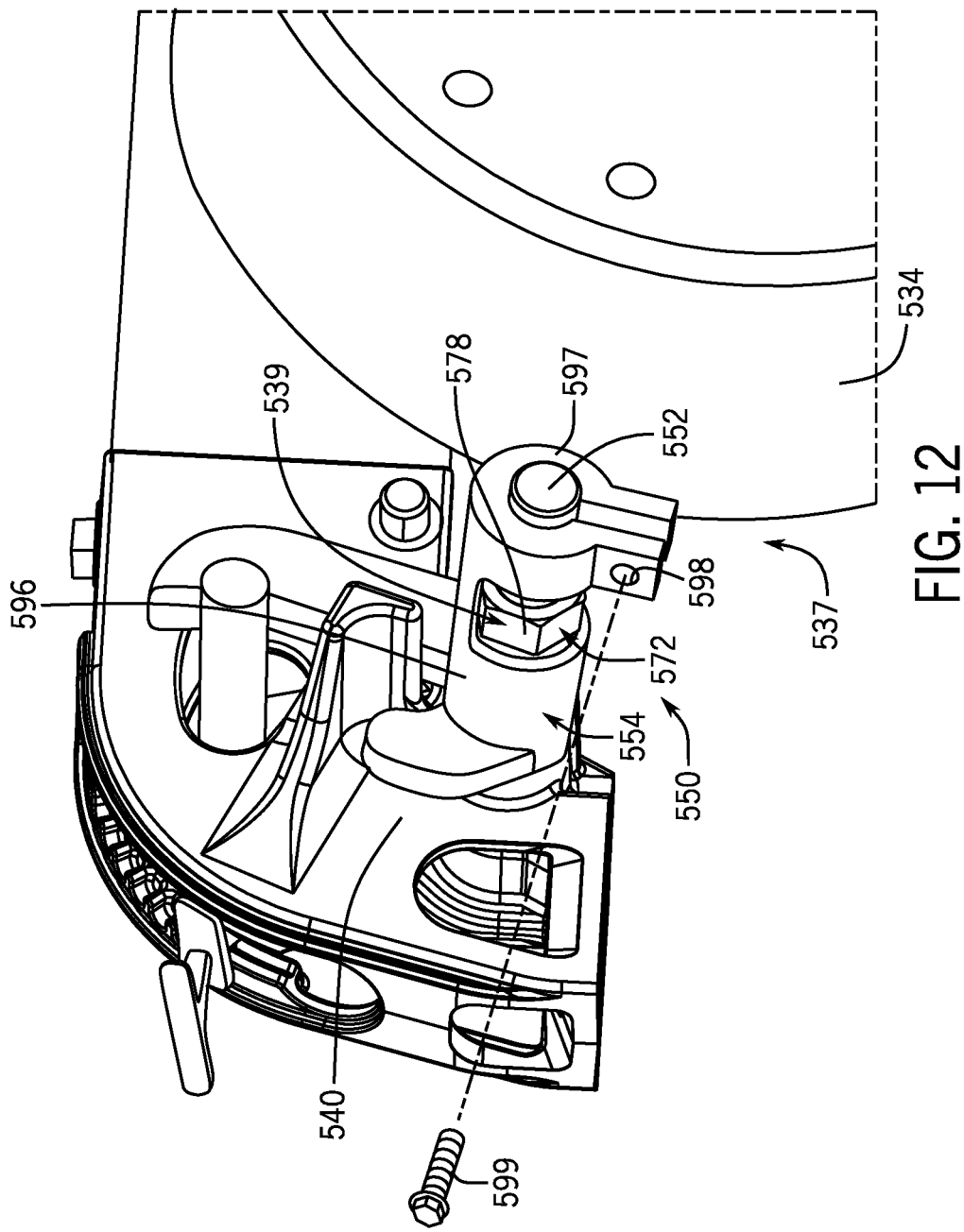
FIG. 12 is an isometric view of the gauge wheel coupling assembly according to additional example embodiments.

Moreover, the gauge wheel coupling assembly 550 is shown in additional embodiments in FIG. 12. The assembly 550 may be substantially similar to one or more embodiments discussed above. Components that correspond to those of the embodiments of FIGS. 2-5 are indicated with corresponding reference numbers increased by 400.

The support arm 554 includes a first part 596 that is substantially cylindrical and hollow and that is threadably engaged with the adjustment bushing 572, similar to embodiments discussed above.

The support arm 554 also includes a second part 597 that is attached to the first part 596. The second part 597 may be disposed laterally outboard from the first part 596. The second part 597 may include a clamping member 598 that extends at least partly about the shank 552 and that clamps to the shank 552. In some embodiments, the clamping member 598 may be clamped to the shank 552 with at least one fastener 599. In some embodiments, the head 578 of the adjustment bushing 572 may be exposed within a gap between the first part 596 and the second part 597.

Accordingly, the assembly 550 may include a coarse adjust coupling 537, which may include the clamping member 598 of the support arm 554 and the fastener 599. To shift the gauge wheel 534 laterally, the fastener 599 may be turned to reduce the clamping force of the second part 597 on the shank 552. Then, the support arm 554, the adjustment bushing 572, and the gauge wheel 534 may be shifted laterally. Once adjusted, the clamping member 598 may be re-tightened onto the shank 552.

The assembly 550 may further include a fine adjust coupling 539. To adjust the lateral position finely, the clamping member 598 may be loosened, and the head 578 of the adjustment bushing 572 may be turned relative support arm 554. Once adjusted, the clamping member 598 may be re-tightened on the shank 552.

In summary, the embodiments of the gauge wheel coupling assembly provide a useful and convenient way of adjusting the lateral position of the gauge wheel. There may be a coarse adjust coupling for making relatively large displacements of the gauge wheel quickly and easily. There may be also be a fine adjust coupling for making fine adjustments of the gauge wheel position, for example, relative to an opener disc.

Also, the following examples are provided, which are numbered for easier reference.

1. A row unit for a work vehicle comprising: a row unit frame; a gauge wheel; and a gauge wheel coupling assembly that attaches the gauge wheel to the row unit frame at a lateral position with respect to the row unit frame, the gauge wheel coupling assembly supporting the gauge wheel for lateral movement to change the lateral position of the gauge wheel; the gauge wheel coupling assembly including a coarse adjust coupling and a fine adjust coupling; the coarse adjust coupling configured for selectively adjusting, at a first increment, the lateral position of the gauge wheel; the fine adjust coupling configured for selectively adjusting, at a second increment, the lateral position of the gauge wheel; and the first increment being larger than the second increment.

2. The row unit of claim 1, wherein the gauge wheel coupling assembly includes a first member and a second member; wherein the first member is fixed to the row unit frame and projects laterally along an axis from the row unit frame; wherein the second member is attached to the gauge wheel; and wherein the coarse adjust coupling engages the second member to the first member at one of a plurality of positions along the axis.

3. The row unit of claim 2, wherein the second member is supported for sliding movement on the first member when moving between the plurality of positions along the axis.

4. The row unit of claim 2, further comprising a retainer member that is attached to one of the first member and the second member and that is removably received within an alignment aperture of the other of the first member and the second member to retain the second member in the one of the plurality of positions.

5. The row unit of claim 2, wherein the gauge wheel coupling assembly includes a support arm that is attached to the gauge wheel; and wherein the second member is attached to the support arm via the fine adjust coupling.

6. The row unit of claim 2, wherein the second member includes a support arm that is attached to the gauge wheel, the support arm including a clamping member; wherein the coarse adjust coupling includes the clamping member that is removably clamped to the first member at one of the plurality of positions along the axis.

7. The row unit of claim 1, wherein the gauge wheel coupling assembly includes a first member and a second member; wherein the first member includes a plurality of first alignment apertures that are spaced apart at a distance; wherein the second member includes a second alignment aperture; and wherein the coarse adjust coupling includes a retainer member that is configured to be received in the second alignment aperture and one of the plurality of first alignment apertures to retain the gauge wheel in the lateral position.

8. The row unit of claim 7, wherein the first member is a shank that is fixed to the row unit frame and that extends laterally therefrom; wherein the shank includes the plurality of first alignment apertures; wherein the gauge wheel coupling assembly includes a support arm that is attached to the gauge wheel and that is attached to the second member; wherein the second member receives the shank and includes the second alignment aperture; and wherein the retainer member is configured to be received in the second alignment aperture and one of the plurality of first alignment apertures to retain the gauge wheel in the lateral position.

9. The row unit of claim 7, wherein the gauge wheel coupling assembly includes a support arm that is attached to the gauge wheel and that is attached to the row unit frame; and wherein the support arm comprises the first member and the second member.

10. The row unit of claim 1, wherein the gauge wheel coupling assembly includes a support arm with a frame attachment portion and a wheel attachment portion; wherein the frame attachment portion is attached to the row unit frame via the coarse adjustment coupling and the fine adjustment coupling; and wherein the wheel attachment portion is attached to the gauge wheel.

11. The row unit of claim 10, further comprising a shank that is fixed to the row unit frame and that extends from the row unit frame, the shank including a plurality of first alignment apertures that are spaced apart along an axis of the shank; further comprising a sleeve that receives the shank, the sleeve including an outer threading, the sleeve including a second alignment aperture; further comprising an adjustment bushing that receives the sleeve; wherein the fine adjust coupling includes a threaded coupling that threadably attaches the adjustment bushing and the frame attachment portion of the support arm; further comprising a retainer member that is threadably attached to the outer threading of the sleeve to retain the adjustment bushing at a fixed position relative to the frame attachment portion of the support arm; and wherein the coarse adjust coupling includes a pin that is received within the second alignment aperture and one of the plurality of first alignment apertures.

12. The row unit of claim 1, wherein the coarse adjust coupling and the fine adjust coupling are both be configured for adjusting the lateral position of the gauge wheel a common axis.

13. The row unit of claim 1, wherein the coarse adjust coupling is configured to adjust the lateral position along a first axis; wherein the fine adjust coupling is configured to adjust the lateral position along a second axis; and wherein the first axis and the second axis are spaced apart at a distance.

14. The row unit of claim 1, wherein the gauge wheel coupling assembly includes a support arm that is attached to the gauge wheel and that is attached to the row unit frame; wherein the gauge wheel coupling assembly includes a hub assembly that attaches the support arm to the row unit frame; and wherein the fine adjust coupling includes an outer diameter threading of the hub assembly and an inner diameter threading of the support arm.

15. The row unit of claim 14, further comprising a retainer member having a tightened position and having a loosened position; wherein, in the loosened position, the support arm is configured to threadably advance along an adjustment axis to change the lateral position of the gauge wheel; and wherein, in the tightened position, the retainer member retains the support arm in a fixed position along the adjustment axis.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A row unit for a work vehicle comprising:
a row unit frame;
a gauge wheel; and
a gauge wheel coupling assembly that attaches the gauge wheel to the row unit frame at a lateral position with respect to the row unit frame, the gauge wheel coupling assembly supporting the gauge wheel for lateral movement to change the lateral position of the gauge wheel;
the gauge wheel coupling assembly including a first member fixed to the row unit frame to project laterally along an axis from the row unit frame and including a second member attached to the gauge wheel;

the gauge wheel coupling assembly including a coarse adjust coupling and a fine adjust coupling;

the coarse adjust coupling engages the second member to the first member at one of a plurality of positions along the axis for selectively adjusting, at a first increment, the lateral position of the gauge wheel;

the fine adjust coupling configured for selectively adjusting, at a second increment, the lateral position of the gauge wheel; and the first increment being larger than the second increment.

2. The row unit of claim 1, wherein the second member is supported for sliding movement on the first member when moving between the plurality of positions along the axis.

3. The row unit of claim 1, further comprising a retainer member that is attached to one of the first member and the second member and that is removably received within an alignment aperture of the other of the first member and the second member to retain the second member in the one of the plurality of positions.

4. The row unit of claim 3, wherein the first member includes a plurality of first alignment apertures that are spaced apart along the axis;

wherein the second member includes a second alignment aperture; and wherein the retainer member extends transverse to the axis to be removably received within the second alignment aperture and one of the plurality of first alignment apertures to retain the second member in the one of the plurality of positions.

5. The row unit of claim 1, wherein the gauge wheel coupling assembly includes a support arm that is attached to the gauge wheel; and wherein the second member is attached to the support arm via the fine adjust coupling.

6. The row unit of claim 5, wherein the fine adjust coupling comprises a threaded coupling.

7. The row unit of claim 1, wherein the second member includes a support arm that is attached to the gauge wheel, the support arm including a clamping member;

wherein the coarse adjust coupling includes the clamping member that is removably clamped to the first member at one of the plurality of positions along the axis.

8. The row unit of claim 1, wherein the gauge wheel coupling assembly includes a first member and a second member;

wherein the first member includes a plurality of first alignment apertures that are spaced apart at a distance;

wherein the second member includes a second alignment aperture; and wherein the coarse adjust coupling includes a retainer member that is configured to be received in the second alignment aperture and one of the plurality of first alignment apertures to retain the gauge wheel in the lateral position.

9. The row unit of claim 8, wherein the first member is a shank that is fixed to the row unit frame and that extends laterally therefrom;

wherein the shank includes the plurality of first alignment apertures;

wherein the gauge wheel coupling assembly includes a support arm that is attached to the gauge wheel and that is attached to the second member;

wherein the second member receives the shank and includes the second alignment aperture; and wherein the retainer member is configured to be received in the second alignment aperture and one of the plurality of first alignment apertures to retain the gauge wheel in the lateral position.

10. The row unit of claim 8, wherein the gauge wheel coupling assembly includes a support arm that is attached to the gauge wheel and that is attached to the row unit frame; and wherein the support arm comprises the first member and the second member.

11. The row unit of claim 1, wherein the gauge wheel coupling assembly includes a support arm with a frame attachment portion and a wheel attachment portion;

wherein the frame attachment portion is attached to the row unit frame via the coarse adjustment coupling and the fine adjustment coupling; and wherein the wheel attachment portion is attached to the gauge wheel.

12. The row unit of claim 11, further comprising a shank that is fixed to the row unit frame and that extends from the row unit frame, the shank including a plurality of first alignment apertures that are spaced apart along an axis of the shank;

further comprising a sleeve that receives the shank, the sleeve including an outer threading, the sleeve including a second alignment aperture;

further comprising an adjustment bushing that receives the sleeve;

wherein the fine adjust coupling includes a threaded coupling that threadably attaches the adjustment bushing and the frame attachment portion of the support arm;

further comprising a retainer member that is threadably attached to the outer threading of the sleeve to retain the adjustment bushing at a fixed position relative to the frame attachment portion of the support arm; and wherein the coarse adjust coupling includes a pin that is received within the second alignment aperture and one of the plurality of first alignment apertures.

13. The row unit of claim 1, wherein the coarse adjust coupling and the fine adjust coupling are both be configured for adjusting the lateral position of the gauge wheel a common axis.

14. The row unit of claim 1, wherein the coarse adjust coupling is configured to adjust the lateral position along a first axis;

wherein the fine adjust coupling is configured to adjust the lateral position along a second axis; and wherein the first axis and the second axis are spaced apart at a distance.

15. The row unit of claim 1, wherein the gauge wheel coupling assembly includes a support arm that is attached to the gauge wheel and that is attached to the row unit frame;

wherein the gauge wheel coupling assembly includes a hub assembly that attaches the support arm to the row unit frame; and wherein the fine adjust coupling includes an outer diameter threading of the hub assembly and an inner diameter threading of the support arm.

16. The row unit of claim 15, further comprising a retainer member having a tightened position and having a loosened position;

wherein, in the loosened position, the support arm is configured to threadably advance along an adjustment axis to change the lateral position of the gauge wheel; and wherein, in the tightened position, the retainer member retains the support arm in a fixed position along the adjustment axis.

17. The row unit of claim 16, wherein the hub assembly includes an adjustment bushing that includes the outer diameter threading;
further comprising a spacer with a first end that abuts the row unit frame and a second end that receives and abuts against the adjustment bushing.

18. A row unit for a work vehicle comprising:
a row unit frame;
a gauge wheel; and
a gauge wheel coupling assembly that attaches the gauge wheel to the row unit frame at a lateral position with respect to the row unit frame, the gauge wheel coupling assembly supporting the gauge wheel for lateral movement to change the lateral position of the gauge wheel;
the gauge wheel coupling assembly including a first member that is fixed to the row unit frame;
the gauge wheel coupling assembly including a support arm that is attached to the wheel;
the gauge wheel coupling assembly including a hub assembly;
the gauge wheel coupling assembly including a coarse adjust coupling between the hub assembly and the first member;
the gauge wheel coupling assembly including a fine adjust coupling between the support arm and the hub assembly;
the coarse adjust coupling configured for selectively adjusting, at a first increment, the lateral position of the gauge wheel along an axis;
the fine adjust coupling configured for selectively adjusting, at a second increment, the lateral position of the gauge wheel along the axis; and
the first increment being larger than the second increment.

19. A work vehicle with at least one row unit comprising:
a row unit frame;
a gauge wheel; and
a gauge wheel coupling assembly that attaches the gauge wheel to the row unit frame at a lateral position with respect to the row unit frame, the gauge wheel coupling assembly supporting the gauge wheel for lateral movement to change the lateral position of the gauge wheel;
the gauge wheel coupling assembly including a shank that is fixed to and that extends laterally from the row unit frame, the shank including a plurality of first alignment apertures that are spaced apart along an axis of the shank;
the gauge wheel coupling assembly having a support arm attached to the wheel;
the gauge wheel coupling assembly including a hub assembly with a second alignment aperture;
the gauge wheel coupling assembly including a coarse adjust coupling with an alignment pin that is received in the second alignment aperture and one of the first alignment apertures to retain the hub assembly in a fixed position along the axis;
the gauge wheel coupling assembly including a threaded fine adjust coupling between the hub assembly and the support arm,
the coarse adjust coupling configured for selectively adjusting, at a first increment, the lateral position of the gauge wheel;
the fine adjust coupling configured for selectively adjusting, at a second increment, the lateral position of the gauge wheel; and
the first increment being larger than the second increment.

* * * * *

UNITED STATES PATENT AND TRADEMARK OFFICE
CERTIFICATE OF CORRECTION

PATENT NO. : 10,798,864 B2  
APPLICATION NO. : 15/952075  
DATED : October 13, 2020  
INVENTOR(S) : Salowitz et al.

Page 1 of 1

It is certified that error appears in the above-identified patent and that said Letters Patent is hereby corrected as shown below:

In the Claims

In Column 15, Claim 8, Line 47, delete "a first member and a second" and insert -- the first member and the second --, therefor.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*